(12) United States Patent
Bechthold et al.

(10) Patent No.: US 7,105,233 B2
(45) Date of Patent: Sep. 12, 2006

(54) USE OF ORGANOMODIFIED SILOXANES FOR SURFACE MODIFICATION OF POLYOLEFINS

(75) Inventors: Nina Bechthold, Essen (DE); Manfred Scheiba, Essen (DE); Stefan Stadtmüller, Essen (DE); Markus Weimann, Bottrop (DE)

(73) Assignee: Goldschmidt GmbH, Essen (DE)

( * ) Notice: Subject to any disclaimer, the term of this patent is extended or adjusted under 35 U.S.C. 154(b) by 13 days.

(21) Appl. No.: 10/910,068

(22) Filed: Aug. 3, 2004

(65) Prior Publication Data
US 2005/0032951 A1 Feb. 10, 2005

(30) Foreign Application Priority Data
Aug. 5, 2003 (DE) ................ 103 35 761

(51) Int. Cl.
*B32B 9/04* (2006.01)

(52) U.S. Cl. ............... 428/447; 428/474.4; 428/500; 428/523; 525/100; 525/106; 525/431; 528/29; 528/31

(58) Field of Classification Search ............... None
See application file for complete search history.

(56) References Cited
U.S. PATENT DOCUMENTS

| 4,608,306 A | * | 8/1986 | Vincent .............. 428/391 |
| 5,147,965 A | | 9/1992 | Ichinohe et al. |
| 5,567,531 A | * | 10/1996 | Gardiner et al. ............ 428/447 |
| 5,789,473 A | * | 8/1998 | Hauenstein et al. ......... 524/265 |

FOREIGN PATENT DOCUMENTS

| EP | 0 475 440 B1 | 3/1992 |
| EP | 0 868 460 B1 | 10/1998 |
| EP | 1 211 277 A2 | 6/2002 |

* cited by examiner

*Primary Examiner*—Marc S. Zimmer
(74) *Attorney, Agent, or Firm*—Frommer Lawrence & Haug LLP

(57) ABSTRACT

The invention provides for the use of organomodified polysiloxanes of the general formula (I)

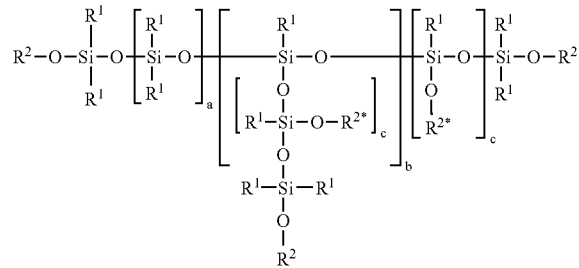

in which
$R^1$ independently at each occurrence is an aliphatic or aromatic $C_{1-20}$ hydrocarbon radical,
$R^2$, $R^{2*}$ independently of one another are $R^1$ or are aliphatic, saturated or unsaturated $C_{1-60}$ hydrocarbon radicals, optionally containing functional groups,
$a=1$ to 500, preferably <100, in particular 5 to 50,
$b=0$ to 50, preferably <20, in particular <10,
$c=0$ to 50, preferably 0 to 10, in particular 0 as additives for surface enhancement in polyolefins.

8 Claims, No Drawings

USE OF ORGANOMODIFIED SILOXANES FOR SURFACE MODIFICATION OF POLYOLEFINS

RELATED APPLICATIONS

This application claims priority to German application Ser. No. 103 35 761.0, filed Aug. 5, 2003, herein incorporated by reference.

BACKGROUND OF THE INVENTION

1. Field of the Invention

The invention relates to the use of organomodified siloxanes as additives which when incorporated into polyolefins lead to a permanent improvement in the surface properties of polyolefin films without the likelihood of adverse consequences of blooming events in downstream worksteps.

2. Description of the Related Art

Polyolefins are nowadays used worldwide industrially and domestically in diverse fields of application as surface coatings, packaging materials, and moldings. In addition to their use as starting material for injection moldings polyolefins are employed in particular for producing films for protection and packaging purposes.

An important prerequisite for the serviceability of these polymers in domestic and industrial use is that the surface properties meet the technical and mechanical requirements of the respective applications. These requirements are, in particular, lubricity and release effect, and also surface scratch resistance and abrasion resistance.

In order to obtain these effects a series of additives have already been proposed for incorporation into the polymers. Thus the slip properties of polyethylene have been improved by using not only the known fluoropolymers but also additives which are more or less migratable, such as fatty acid arides or polyolefin waxes, or by applying external lubricants (Chapman, Handbook of Plastics Additives; Gaechter, Müller, Kunststoffadditive, Carl-Hanser Verlag).

For some time additives based on silicone oil, in the form of polymer masterbatches, have been used. There are numerous descriptions of such additives and they are available, for example, under the name MB 50 from Dow Corning. Said silicone component comprises ultrahigh molecular weight, nonfunctional silicone oils, having molecular weights of from 40 000 to 400 000, which are processed in a polymer vehicle. Used in recommended concentrations of up to 2%, as an internal and external lubricant, these additives improve the processing properties of the polymer. The high molecular weight dictates that the siloxane is retained in the polymer. The mobility, or migration, is indeed inhibited but ultimately cannot be entirely ruled out, and so there is a risk of an impairment of adhesion on substrates comprising additives. Another adverse feature is that exceedance of the additive's solubility limit in the polymer is accompanied by blooming phenomena, manifested in the formation of surface coverings. The possible consequences include problems when coating (reduced adhesion properties), printing or varnishing.

EP-B-0 868 460 describes clear, scratch-resistant coating compositions (top coats) which in order to make them scratch resistant comprise essentially acrylosilane polymers.

Radiation-curing coatings are known and are described in, for example, "UV & EB curing formulation for printing inks, coatings & paints" (R. Holman, P. Oldring, London 1988).

The epoxy acrylates, frequently used for paper coatings in particular, are prized for their rapid curing and the achievable hardness and chemical resistance. For high-grade coatings use is also made of urethane acrylates, which in addition to improved flexibility give rise, in particular, to excellent wetting properties and also chemical resistance and hardness.

Polysiloxanes containing acrylate ester groups (acrylate groups) have proven suitable for use as additives which can be cured under high-energy radiation, for printing inks and for producing film-forming binders or for coating materials for surfaces of plastic, paper, wood, and metal, for example. Curing takes place in particular by UV radiation (following the addition of known photoinitiators, such as benzophenone and its derivatives, for example) or by electron beams.

In any case, however, the application of external siloxane coats to prefabricated plastics parts is associated with an additional workstep which as well as increasing manufacturing costs also raises the rejection risk According to patent application EP-A-1 211 277 it is also possible for siloxane-modified polyolefins to be additives for polyolefins in order to improve the surface scratch resistance, release effect, abrasion resistance, weathering stability, and water repellency. According to that patent application these substances are used as processing auxiliaries in the production of polyolefin films, especially polyethylene films, in order to suppress melt fracture behavior.

Within the packaging industry the intention was to ensure that, as a result of addition of the additive, the product is endowed very quickly with a release effect, so that labels or codes adhered to it can be removed subsequently without damaging the product.

Within the art there is therefore a need for additives which at low concentrations enhance the handling properties of articles, especially serially printed articles, the effects of these adjuvants being in particular to improve the scratch resistance of the fresh surfaces, to increase their slip properties, to exhibit a high release effect very soon after crosslinking, and, as a result of their crosslinking, remain immobile in the film.

Films are also modified using standard commercial fluoropolymers, which likewise influence the surface characteristics. Amounts added are from 0.05% to 0.1% by weight. The effect of these additives are a higher productivity and, as a result, a lower temperature load on the polymers. A further result of adding these additives is to make the surface of the polymers water repellent. These polymers, however, have processing drawbacks. In order to obtain full effectiveness it is necessary for a film to be formed between polymer melt and metal surface, and that requires conditioning.

Films with a release effect based on silicone oils or halogen compounds are normally not sealable; that is, they cannot be welded. Sealability or weldability, however, is an important criterion in the packaging segment. When the compound of the invention is used it is possible for the first time, surprisingly, to produce sealable films which at the same time have release effect.

OBJECTS OF THE INVENTION

It is an object, inter alia, of the present invention positively to modify surfaces of films produced from thermoplastic polymers by incorporating into them suitable additives. The intention was in particular to promote frictional properties, release properties, without adversely affecting sealability or printability. An important prerequisite is therefore that migration events are very largely suppressed.

Surprisingly this object has been achieved through the use of organomodified polysiloxanes with long-chain aliphatic radicals attached. Inventive additives of this kind are notable for greatly reduced migratability, which is otherwise a deficiency of such compounds, and lead to the abovedetailed positive effects on the film surface. This and other object will become apparent from the following description of the invention.

DESCRIPTION OF THE INVENTION

The invention provides, inter alia, for the use of organomodified polysiloxanes of the general formula (I)

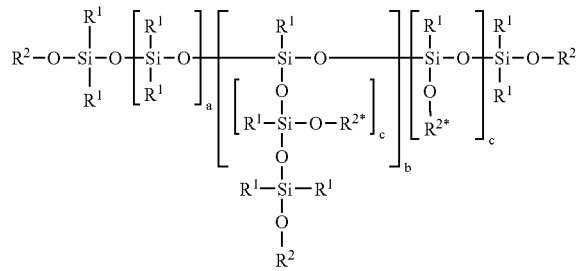

in which
R$^1$ independently at each occurrence is an aliphatic or aromatic C$_{1-20}$ hydrocarbon radical,
R$^2$, R$^{2*}$ independently of one another are R$^1$ or are aliphatic, saturated or unsaturated C$_{1-60}$, preferably C$_{8-40}$, hydrocarbon radicals, optionally containing functional groups,
a is 1 to 500, preferably <100, in particular 5 to 50,
b is 0 to 50, preferably <20, in particular <10, and
c is 0 to 50, preferably 0 to 10, in particular 0 as additives for surface enhancement in polyolefins.

Preferably, this invention provides for a method of improving the surface properties of filled or unfilled polyolefin films which comprise adding about 0.001 to about 5% by weight, based upon polyolefin polymer, organomodified polysiloxanes of formula (I) to the polyolefin polymer and extruding the polymer. Surface properties include, for example, fraction coefficient, scratch resistance roughness, water repellency, weathering stability, slip properties, release effect, and/or abrasion resistance.

Independently of one another means that not only radicals R$^2$ but also the radicals R$^{2*}$ may each individually be identical or different.

In the organomodified polysiloxanes preferred in accordance with the invention at least 90% of the radicals R$^1$ are methyl radicals.

The radicals R$^2$ and $^{2*}$ are the hydrocarbon radicals of the alcohol used in the preparation process. They may be uniform radicals of defined chain length, such as, for example, the radicals of C$_{8-22}$ fatty alcohols, or a mixture differing in chain length in the range of approximately C$_{8-60}$, in which the chain lengths from ≅C$_{18}$ to ≅C$_{100}$ account on average for 50 to 70% by weight of the overall distribution. Preferably R$^2$ and R$^{2*}$ are aliphatic hydrocarbon radicals of ≅C$_{20}$ to C$_{40}$. Mixtures of this kind of alcohols are technical-grade commercial products. The mixtures used in accordance with the invention have an average distribution of
about <4% by weight <C$_{18}$,
about 50 to 80% by weight C$_{18-40}$,
about 16 to 46% by weight >C$_{40}$.

The skilled worker is aware that the compounds of the general formula (I) may be present in the form of a mixture having a blockwise distribution or a distribution governed essentially by the laws of statistics, in which the values for the indices represent average values.

The compounds of the general formula (1) used in accordance with the invention can be prepared by conventional prior art methods by condensation reaction or transesterification reaction, as described for example in U.S. Pat. No. 5,147,965 or EP-B-0 475 440. Preference is given in accordance with the invention, however, to compounds which are prepared by methods of dehydrogenative coupling, as described in the applications, unpublished at the priority date of the present specification, bearing the references DE-103 12634.1 and DE-103 12636.8.

Through the preparation of the organomodified siloxanes by the preferred technique of a salt-free coupling reaction the substance is free from chloride ions. The risk of hydrolysis of the Si—O—C bond is therefore averted, and so it is ensured that there is no free silicone oil in the product that leads to instances of migration.

The invention further provides for the use of the compounds of the general formula (I) as in-process additives in the preparation of polymer formulations. Owing to the surprisingly great compatibility of the compounds of the invention with the polymers they remain durably and stably in homogeneous distribution.

By virtue of this quality it is possible for the first time to produce blown films and flat films which exhibit excellent slip properties and release properties.

For producing such films it is necessary in accordance with the known prior art to employ a two-stage process, in which the films are produced in the first stage and in a separate operation it is then necessary to apply additional coatings having release properties to said films.

With the aid of the compounds of the invention this second step is now no longer necessary. The compounds in the proportions required are mixed into the polymer granules and the mixture is compounded as described below.

The resulting polymer granules with the organically modified siloxane can be applied directly as a release coating (monofilm, coextruded film, laminated film or coextruded coated layer) by the methods of film extrusion or film coextrusion which are customary in the industry. This film can be produced by blown film extrusion, flat film extrusion or extrusion coating.

Similar processes are known from the prior art, with halogen compounds, especially fluorine compounds.

An advantage of polysiloxanes of the invention is the possibility of incorporating them in homogeneous distribution in the polymer by means of operating steps which are familiar to the skilled worker, thereby avoiding deposits on the surface of the film. Sealability, printability or weldability of the films which have been treated with polysiloxanes of the invention are therefore not adversely affected. Likewise avoided is deposition on the surfaces of the processing machinery, such as the extruders, and there is no need for costly and inconvenient cleaning processes. A further advantage of polysiloxanes of the invention is their freedom from salt; this advantage is manifested even during the preparation of the polysiloxanes, and avoids the needs for costly and inconvenient removal of resultant salts, by filtration, for instance. This advantage is likewise manifested when these polysiloxanes of the invention are employed, since degradation reactions as a result of residual chloride ions cannot occur.

EXAMPLES

Typical use concentrations at which advantages of the compounds of the invention become apparent are in the range from about 0.01% to about 5% by weight, preferably in the range from about 0.1% to about 2.0% by weight, based on the polyolefin.

The compound formulations comprising organomodified siloxanes of the invention are prepared, in a manner familiar to the skilled worker, in a two-stage process.

The polymer is premixed with the organomodified siloxane and with any other ingredients, such as pigments, fillers, and other additives, such as antioxidants or antistatic additives, for example. Premixing is carried out using mixing equipment such as Henschel mixers, tumble mixers or automatic metering systems which operate volumetrically or gravimetrically, for example.

Compounds of the invention are subsequently embedded into the polymer under the effect of shear forces, e.g., by incorporation in an extruder. Possible alternatives include incorporation in a kneading apparatus or with melting in a reactor.

Polyolefins which can be used for the compounds of the invention are basically any polymers, possibly containing fillers such as chalk, talc, silica and/or $TiO_2$, for example, that are synthesized from hydrocarbons of the formula $C_nH_{2n}$ with one double bond (ethylene, propylene, 1-butene, isobutene). They include polyethylene, polypropylene, poly-1-butene, polyisobutylene, poly-4-methylpentene, and copolymers thereof. In addition it is also possible to use polyamides.

The compounds used in accordance with the invention are incorporated into the polymer in the melted state, with stirring, in a reactor or using extruders.

Preparation of the compound formulations:

Prior to extrusion a homogeneous mixture of the additives with the polymer was prepared. The choice of mixing method was dependent on the type of formulation and the aggregate state of the additive.

For the testing of noninventive compounds use was made of commercially available products as described in Table 1. The inventive examples 7 and 8 were produced beforehand in a synthesis. The preparation instructions are described below for example 7, as an example.

The premixing of the solid additives (in pellet or powder form) was carried out manually. The additive was stirred into the polymer by hand for 5 minutes. Liquid additives were coated onto the polymer granules in a tumble mixer of Engelmann make, model Mini 80, at 100 rpm and then the additived granules were added to the extruder using a metering balance.

The premixes (1.5 kg) are prepared in a tumble mixer (Engelmann Mini 80). For their preparation the corresponding amount of additive (1 to 10 phr) is blended with the polymer vehicle. Mixtures of polymer granules and additives in powder, granule, and pellet form cause no problems to the metering equipment Extrusion in a Twin-Screw Extruder:

The additives were mixed homogeneously into the polymer using a corotating twin-screw extruder, model Micro 27 from Leistritz. The extruder is constructed from a total of nine individual barrel zones and one feed zone. The heaters are controlled by temperature regulators. The temperature deviations are very small (not more than 2 to 3° C.). The feed zone is cooled with mains water. The die of the extruder is heatable. The extruder is equipped with a cylinder devolatilizing zone (atmospheric and vacuum). This is important with a twin-screw extruder, since the extruder can be run with a higher throughput in order to prevent air inclusions.

The granules with additive are metered using a differential metering balance of type DDW-H$_2$O from Brabender. This balance is suitable not only for continuous gravimetric metering but also for poorly free-flowing powderous to fibrous bulk materials. In all of the experiments in which the metering balance was used to meter in the granules with additive, a single-screw module with trough stirrer was used.

The added active substance concentration was from 0.01 to 1 phr. For each compound formulation, the rotary speed of the extruder was set at 200 rpm and the throughput was held at 6 kg/h by means of the variable addition of the metering balance.

Film Extrusion:

To produce blown films the polymer is plastified in an extruder and then extruded annularly in a film blowing die as a hot film bubble (Plasti-Corder LabStation with recording extruder 19/25D with film blowing unit, Brabender). The blown film is taken off toward the top. Thereafter the film is collapsed and taken off through a pair of rolls. The film can be wound in the form of a plane or side-gusseted tube or, after cutting, in the form of a half-tube or flat film. Typical parameters for PP and PE-LD were as follows:

PP at 220 to 240° C., PE at 135 to 170° C. at from 40 to 50 rpm, takeoff speed 300 to 400 cm/min, air regulation 8 to 10 l/h.

Performance Testing:

(1) Determination of the Melt Index MFI:

The melt flow measurement was conducted on the Meltfixer® instrument from SWO Polymertechnik. For sample preparation the polymer granules were dried at 60° C. for 2 h prior to measurement. In the testing of the compound formulation the specified mass of sample (3 to 8 g) was introduced into the cylinder, which had been preheated to test temperature, and was compacted and preheated (5 to 15 min). The piston was then loaded with the weight prescribed for the particular test. Sections of the emerging strand of equal length, in the range from 10 to 20 mm, were separated off at constant intervals of time (5 to 240 s, depending on fluidity). After cooling, the extrusion sections were weighed to an accuracy of 0.001 g. The melt index was calculated as follows:

$$MFI = \frac{m \cdot 600}{t}$$

m mass of the extrudate sections;

t in sec: flow time of the extrudate sections;

600 factor for reference time of 10 min.

(2) Measurement of the Sliding Friction (Friction Coefficient; COF):

The sliding friction was determined in accordance with DIN 53 375, ISO 8295-Determination of frictional characteristics-.

The measurement was conducted on tubular film (dimensions: 300×70 mm, thickness 50 µm).

Sliding cylinder 520 g, cross section 12.6 mm$^2$, stinless steel

Measuring distance 150 mm

Speed 12 mm/sec.

Other measurements relating to the sliding friction were conducted on films (dimensions: 300×70 mm, thickness 50 µm).

Sliding cylinder 520 g, cross section 12.6 mm$^2$, sliding medium: standard felt Measuring distance 200 mm Speed 12 mm/sec.

The sliding friction was measured immediately following production, on the freshly molded plate, and after storage (7 days at 20° C.).

(3) Measurement of the Release Properties:

Release Force:

The release forces were determined using different adhesive tapes, 25 mm wide, from Beiersdorf-specifically, an adhesive tape coated with rubber adhesive—which are available commercially under the designation TESA® 4154.

To measure the adhesiveness this adhesive tape is rolled onto the substrate and then stored at 40° C. under a weight of 70 g/cm². After 24 hours a measurement is made of the force required to peel the respective adhesive tape from the substrate at a speed of 30 cm/min and at a peel angle of 180°. This force is termed the release force or release value. The general test procedure corresponds essentially to FINAT Test Method No. 10.

APPLICATION EXAMPLES

Materials Used:

A) Polymers Used:

Polypropylene homopolymer, e.g. Stamylan® 14 E 10, Sabic (MFI=2.5) Polyethylene, PE-LD, e.g. Escorene® LD 100 BW, Exxon Mobil (MFI=2).

B) Additives Used:

| | Substances tested |
|---|---|
| Reference | no additiv |
| Compound 1 | Stearamide, Crodamide SR (Avokal Handelsgesellschaft mbH) |
| Compound 2 | Erucamide, Loxamid E (Cognis) |
| Compound 3 | Polyolefin wax, dropping point about 96° C., melt viscosity (100° C.) < 1000 mPas (Degussa) |
| Compound 4 | Silicone wax, alkyl-modified (Tp* 6846; Degussa) |
| Compound 5 | Silicone oil, $R^1$ —methyl and alkyaryl radicals (Tp 6870; Degussa) |
| Compound 6 | Silicone masterbatch (50% by weight silicone) (Dow Corning) |
| Compound 7 | Inventive compound, $R^1$ —methyl radicals, $R^2$ —mixture of long-chain alcohols |
| Compound 8 | Inventive compound, $R^1$ —methyl radicals, $R^2$ —mixture of long-chain alcohols |
| Compound 9 | Fluoropolymer, MFI = 5 to 14 g/10 min, 265° C., 5 kg, melting point: 110 to 126° C., specific density: 1.9 to 1.96 g/cm³ (DuPont) |

*Tp = TEGOPREN ®, brand name of Goldschmidt AG

Inventive compounds used are compounds 7 and 8. Comparative examples are compounds 2 to 6 and 9.

Preparation of the Inventive Compounds:

Reactions of hydrosiloxanes in a dehydrogenative hydrosilylation using alcohols of the general formula $R^2$—OH in which $R^2$ is a mixture of aliphatic hydrocarbon radicals with $\cong C_{20-40}$. Mixtures of this kind of alcohols are technical-grade commercial products. The mixtures used in accordance with the invention have an average distribution of about <4% by weight $<C_{18}$, about 50 to 80% by weight $C_{18-40}$, about 16 to 46% by weight $>C_{40}$.

WORKING EXAMPLES

Example 7

54.6 g of $Me_2HSiO(SiMe_2O)_{15}SiMe_2H$ (SiH value 1.82 eq/kg) were reacted with 45.4 g of the aforementioned alcohol. The alcohol was used with an excess of 10% by mass. At 90° C. 0.51 g of borane catalyst, corresponding to 0.5 mol % based on the SiH value, was added. The reaction temperature rose briefly to 102° C. After 25 minutes the conversion in accordance with the SiH value method was 100%. Prior to filtration through a depth filter, 1 g of N-methylmorpholine was added in each case.

Inventive Example 8

The reaction proceeded as in example 7; the reactant used was $Me_2HSiO(SiMe_2O)_{30}SiMe_2H$ (SiH value 0.92 eq/kg).

Experimental Results:

| Polypropylene (Stamylan 14 E 10, MFI 2), additives 0.5 phr | |
|---|---|
| | Friction coefficient/COF |
| Reference | 0.40 |
| Compound 1 | 0.18 |
| Compound 2 | 0.18 |
| Compound 3 | 0.32 |
| Compound 4 | 0.36 |
| Compound 5 | 0.34 |
| Compound 6 | 0.30 |
| Compound 7 | 0.18 |
| Compound 8 | 0.17 |

| Polyethylene (PE-LD, Escorene LD 100 BW, MFI 2), additives 0.5 phr | |
|---|---|
| | Friction coefficient/COF |
| Reference | 0.54 |
| Compound 1 | 0.39 |
| Compound 2 | 0.22 |
| Compound 3 | 0.38 |
| Compound 4 | 0.44 |
| Compound 5 | 0.36 |
| Compound 6 | 0.40 |
| Compound 7 | 0.29 |
| Compound 8 | 0.31 |

| | MFI | Release force TESA ® 4154 N/2.5 cm |
|---|---|---|
| Reference | 2.5 | 8.30 |
| Compound 1 | 2.3 | 7.90 |
| Compound 2 | 2.5 | 8.32 |
| Compound 3 | 2.5 | 7.90 |
| Compound 4 | 2.7 | 8.19 |
| Compound 5 | 2.3 | 8.12 |
| Compound 6 | 2.2 | 7.49 |
| Compound 7 | 2.5 | 4.97 |
| Compound 8 | 2.5 | 4.83 |
| Compound 9 | 1.9 | 7.50 |

As can be seen, using the inventive compound does not affect the melt flow index but instead retains it unchanged within the range required by production engineering.

| Compound 7% | Polypropylene (Stamylan 14 E 10, MFI 2) | Polyethylene (PE-LD, Escorene LD 100 BW, MFI 2) | Polypropylene (Stamylan 14 E 10, MFI 2) | Polyethylene (PE-LD, Escorene LD 100 BW, MFI 2) |
|---|---|---|---|---|
| 0 | 1.030 | 717 | 86 | 92 |
| 2 | 558 | 264 | 68 | 89 |
| 3 | 433 | 242 | 70 | 90 |
| 5 | — | 218 | — | 69 |
| 7.5 | — | 156 | — | 56 |
| 10 | — | 115 | — | 50 |

Increased proportions of the inventive compounds lower the release forces until they reach the technically acceptable limit of residual bond strength, thereby ensuring a great deal of variability in handling.

The above description is intended to be illustrative and not limiting. Various changes in the embodiments described herein may occur to those skilled in the art. These changes can be made without departing from the scope or spirit of the invention.

What is claimed is:

1. A method for improving surface properties of filled or unfilled polyolefin films which comprises adding about 0.001 to about 5% by weight, based upon polyolefin polymer, organomodified polysiloxanes of the formula

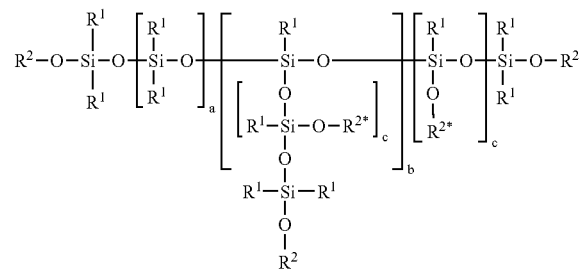

in which
R$^1$ independently at each occurrence is an aliphatic or aromatic C$_{1-20}$ hydrocarbon radical,
R$^2$, R$^{2*}$ independently of one another are R$^1$ or are aliphatic, saturated or unsaturated C$_{1-60}$ hydrocarbon radicals, optionally containing functional groups,
a=1 to 500,
b=0 to 50,
c=0 to 50
to the polyolefin polymer and extruding the polymer, wherein the organomodified siloxanes are prepared by dehydrogenerative coupling.

2. The method according to claim 1, wherein the surface properties are friction coefficient, scratch resistance, roughness, water repellency, weathering stability, slip properties, release effect, and/or abrasion resistance.

3. The method according to claim 1, wherein at least 90% of the radicals R$^1$ in the organomodified polysiloxanes are methyl radicals.

4. The method according to claim 1, wherein a in the organomodified polysiloxanes is 5 to 100 and b and c=0.

5. The method according to claim 1, wherein a in the organomodified polysiloxanes is 10 to 50 and b and c=0.

6. The method according to claim 1, the amount of organomodified polysiloxanes is between about 0.01% to about 5% by weight, based on the polymer.

7. The method according to claim 1, wherein the polymer film is polyethylene, polypropylene, or polyamide film.

8. The method according to claim 1, wherein the amount of organomodified polysiloxanes is between about 0.1% to about 5% by weight, based on the polymer.

* * * * *